United States Patent [19]

Ida et al.

[11] Patent Number: 5,306,746

[45] Date of Patent: Apr. 26, 1994

[54] RESIN COMPOSITIONS AND OPTICAL PRODUCTS MAKING USE THEREOF

[75] Inventors: Kozo Ida; Tetsuya Suda, both of Kawasaki, Japan

[73] Assignee: Mitsubishi Rayon Co., Ltd., Tokyo, Japan

[21] Appl. No.: 838,258

[22] PCT Filed: Jul. 10, 1991

[86] PCT No.: PCT/JP91/00922

§ 371 Date: Mar. 10, 1992

§ 102(e) Date: Mar. 10, 1992

[87] PCT Pub. No.: WO92/01020

PCT Pub. Date: Jan. 23, 1992

[30] Foreign Application Priority Data

Jul. 11, 1990 [JP] Japan .................................. 2-183329
Jul. 12, 1990 [JP] Japan .................................. 2-184478

[51] Int. Cl.[5] ............................ C08K 9/00; C08K 5/42
[52] U.S. Cl. ..................................... 523/206; 524/145; 524/161; 524/166; 524/394; 524/396; 525/185; 525/201
[58] Field of Search ................. 523/206; 524/145, 161, 524/166, 394, 396; 525/185, 201

[56] References Cited

U.S. PATENT DOCUMENTS

| | | | |
|---|---|---|---|
| 4,390,656 | 6/1983 | Weise et al. | 524/539 |
| 4,471,078 | 9/1984 | Ida | 524/730 |
| 4,548,979 | 10/1985 | Weise et al. | 524/539 |
| 4,563,494 | 1/1986 | Ida | 524/398 |

FOREIGN PATENT DOCUMENTS 0100519 2/1984 European Pat. Off. .
51-58444 5/1976 Japan .
51-584444 5/1976 Japan .
58-225148 12/1983 Japan .
60-65050 4/1985 Japan .
60-161458 8/1985 Japan .

OTHER PUBLICATIONS

Patent Abstracts of Japan, vol. 009, No. 309 (C-318) Dec. 15, 2985, & JP-A-60 149 615, Aug. 7, 1985, Shirakawa Hideo et al., "Production of Neodymium-Containing Monomer Composition and Production of Neodymium-Containing Transparent Resin by Polymerizing Said Monomer Composition".

Patent Abstracts of Japan, vol. 009, No. 088 (C-276) Apr. 4, 1985, & JP-A-59 217 705, Dec. 7, 1984, Uehara Hiroshi, et al., "Neodymium-Containing Transparent Resin and Its Preparation".

*Primary Examiner*—Kriellion S. Morgan
*Attorney, Agent, or Firm*—Oblon, Spivak, McClelland, Maier & Neustadt

[57] ABSTRACT

The present invention relates to a resin composition which selectively absorbs light of the wavelength band in the vicinity of wavelength 580 nm, as well as to the optical products to be formed from this resin composition. The beads possessing light selective function are formed from a transparent polymer which contains a neodymium compound: these beads are then dispersed in a transparent resin composition. Comparing to the case when the neodymium compound is directly dispersed in the resin composition, a large amount of neodymium compound can be added to the resin composition without decreasing the mechanical and thermal properties of the resin composition.

8 Claims, 2 Drawing Sheets

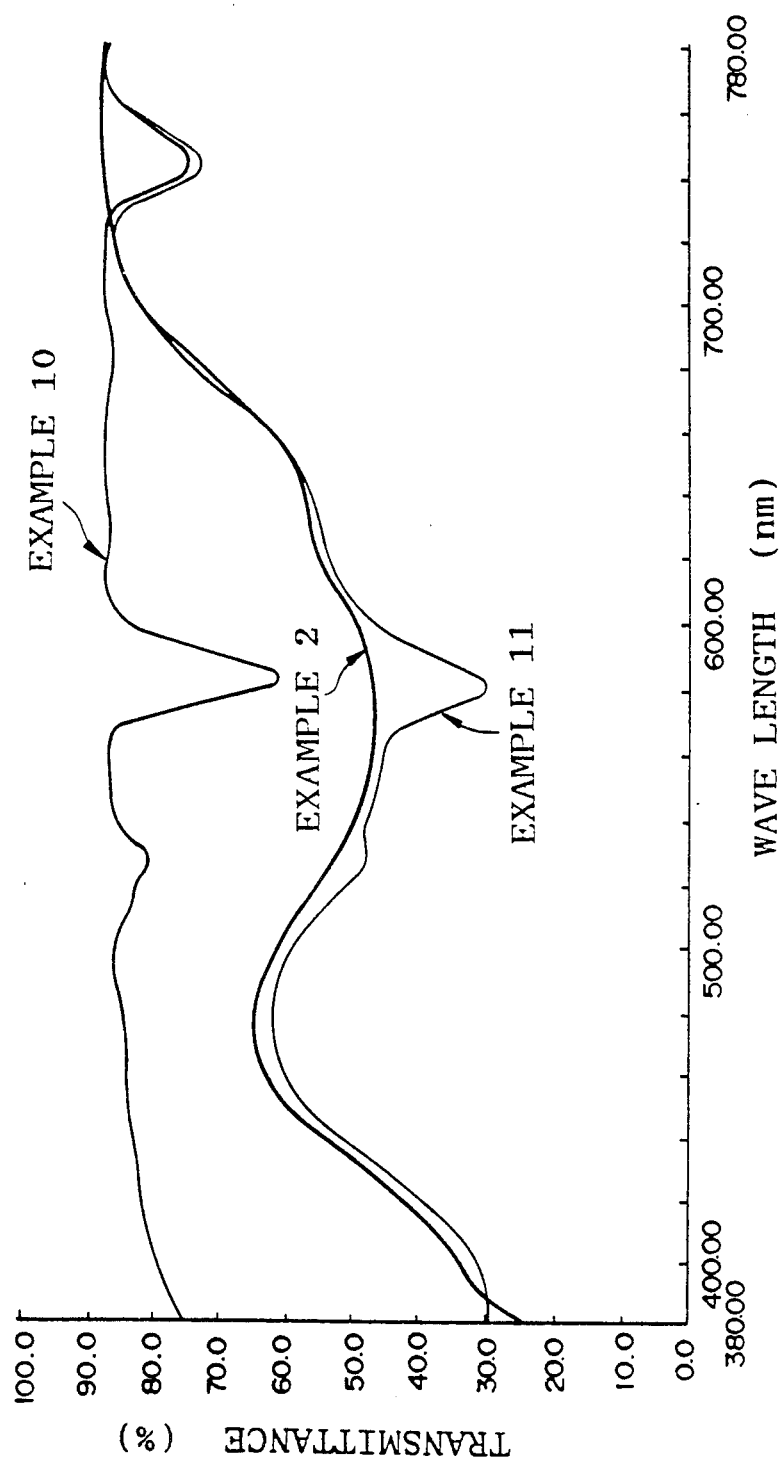

_5,306,746_

RESIN COMPOSITIONS AND OPTICAL PRODUCTS MAKING USE THEREOF

FIELD OF THE INVENTION

This invention relates to a resin composition which selectively absorbs light of the wavelength band in the vicinity of a wavelength of 580 nm and further relates to optical products thereof, such as filters, lenses and screens.

BACKGROUND OF THE INVENTION

Hitherto, some products are known, making use of the characteristic that neodymium compounds absorb light selectively in the vicinity of the wavelength of 580 nm. For example, first publication Sho 58-225148 discloses a selective light absorptive resin compound where neodymium oxide powder is dispersed in a transparent plastic base material, such as methacrylic resin, and optical products making use thereof. Furthermore, first publication Sho 60-161458 discloses neodymium-containing transparent resin compounds obtained by polymerizing a mixture of monomers such as alkyl (meth)acrylate and styrene, neodymium compounds such as neodymium acrylate, a carboxylic acid as a solvent of this neodymium compound and a polymerization initiator by the cell-cast method and optical products making use thereof.

These optical products have the characteristic of selectively absorbing light in the range of a wavelength of 580 nm, and are used in filters of color display equipment, such as color CRT, screen boards, lenses and lighting equipment.

However, the resin composition where neodymium oxide powder is dispersed in the transparent plastic base material is a disperse system of inorganic powder and therefore, there are the weak points that the transparency and light transmittance decreases, the absorption peak broadens, and further the quantity of absorbed light is small.

Since the optical products stated in first publication Sho 61-161458 are derived from a resin composition which is obtained by molecular binding a neodymium compound with, or dissolving it in a solvent and a polymer, there are changes in such properties as the mechanical characteristics of the polymer itself, and when trying to introduce a sufficient amount of neodymium compound, it brings about the inconvenience of grave deterioration of the mechanical and thermal properties of optical resin compounds and optical products.

SUMMARY OF THE INVENTION

It is therefore an object of the present invention to provide a resin composition and an optical product making use thereof which has sharp absorption characteristics, without troubles such as a decrease in transparency and light transmittance and deterioration in the characteristics of the resin composition.

The resin composition of this invention has superior light selective functions because beads having light selective function arising from introducing a neodymium compound into a transparent polymer are dispersed in the transparent resin composition, and furthermore do not show a decrease in the characteristics of the resin composition even when the neodymium content is raised.

The resin composition of this invention has superior light selective functions because it is a resin composition where beads having light selective function arising from introducing a neodymium compound into a transparent polymer are dispersed in the transparent optical product, and furthermore does not show a decrease in the light selective function even when the neodymium content is raised.

BRIEF EXPLANATION OF THE FIGURES

FIG. 2 is a spectrum showing the spectral characteristics of a resin sheet attained by the preferred embodiment of the present invention.

DETAILED DESCRIPTION OF THE PREFERRED EMBODIMENTS

Figure 1:
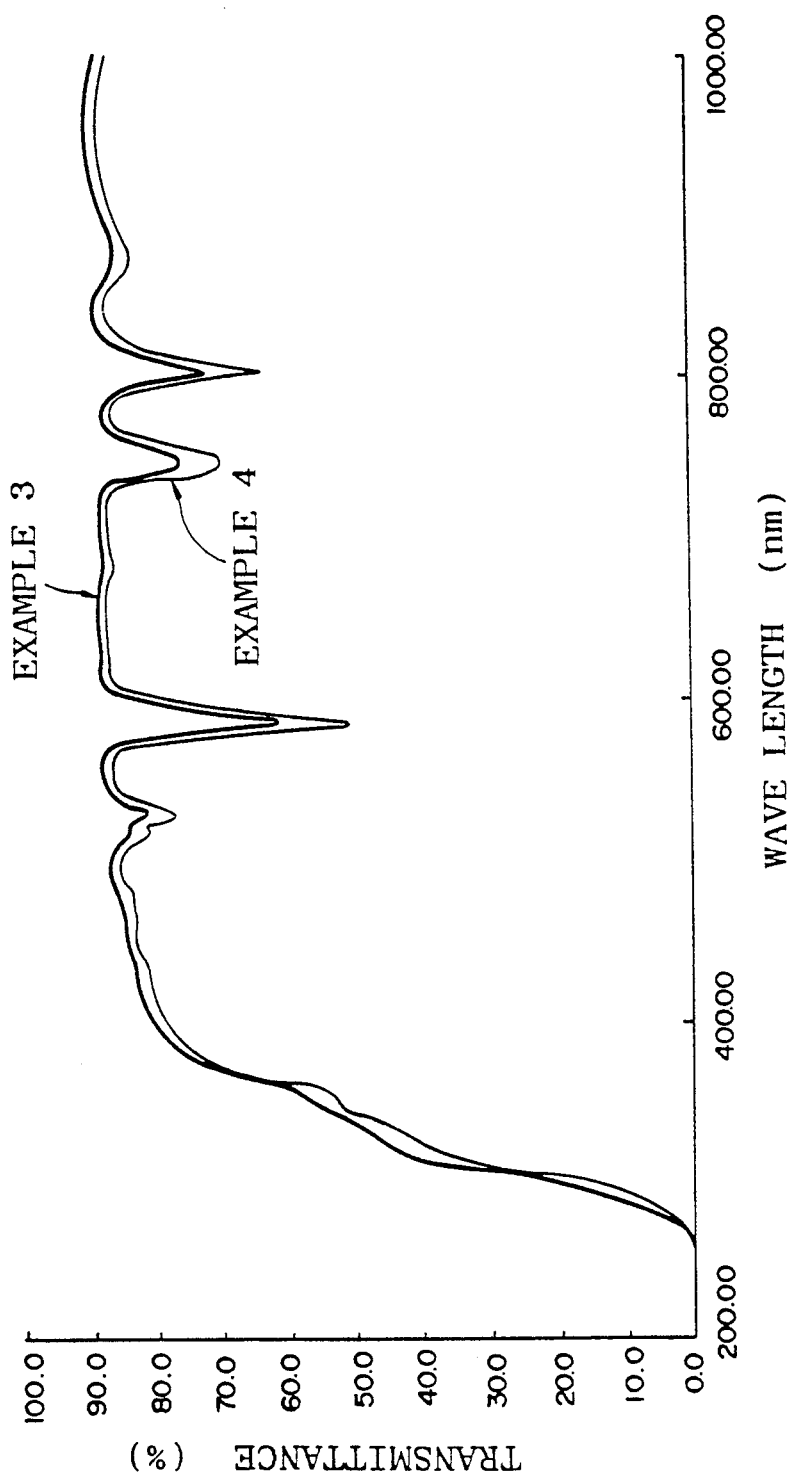
FIG. 1 is a spectrum showing the spectral characteristics of a resin sheet attained by the preferred embodiment of the present invention.

Hereinafter, a detailed explanation on the invention is given.

The beads with light selective function used in the present invention are particles in which a neodymium compound is introduced into a transparent polymer. The particle size of these beads lies in the range of 0.01 $\mu$m and 5 mm. This particle size may suitably be chosen according to the use of the beads.

The neodymium compound within the beads having an light selective function can be chemically bonded to transparent polymers by such means as copolymerization, or also can be dissolved in the transparent polymers. But, it is necessary that the beads themselves are transparent.

If the neodymium compound used in the present invention can be uniformly dispersed in the transparent polymer, any compound can be used, and if the neodymium compound is chemically bonded to a transparent polymer, a polymerizable unsaturated neodymium carboxylate can be used. If chemically bonding is not necessary, one type or a mixture of two or more types of the following may be used: neodymium carboxylates, neodymiun salts of mono alkyl phosphate, and aliphatic or aromatic neodymium salts of sulfonic acid which are all unpolymerizable. Furthermore, as a neodymium compound, a copolymerizable unsaturated neodymium carboxylate and at least one other kind of the aforementioned neodymium compounds can be used. As a neodymium compound neodymium carboxylate is desirable.

When a neodymium compound is dispersed in the transparent polymers, the polymerizable neodymium compound and the monomer for forming a transparent polymer can be suspension copolymerized to form a uniform mixture, or the monomer for forming a transparent polymer may be suspension polymerized in a condition that the non-polymerizable neodymium compound is uniformly dispersed within the monomer to form a polymer. Hereinafter follows an explanation for the case when a polymerizable unsaturated neodymium carboxylate is used.

Neodymium salts of polymerizable unsaturated carboxylic acids include neodymium (meth)acrylate, neodymium acrylate, neodymium α-chloro acrylate, neodymium α-ethyl (meth)acrylate, neodymium maleate, neodymium fumarate, neodymium itaconate, etc.

Neodymium salts of non-polymerizable carboxylic acids which can be used include salts of saturated fatty acids such as propionic acid, n-butyric acid, iso-butyric acid, n-valeric acid, iso-valeric acid, n-capronic acid, n-caprylic acid, n-capric acid, α-ethyl hexanoic acid, lauric acid, stearic acid etc; or neodymium salts of non-polymerizable unsaturated fatty acids and aromatic carboxylic acids such as oleic acid, linoleic acid, linolenic acid, recinoleic acid, benzoic acid, phthalic acid, succinic acid, naphthenic acid, maleic acid, itaconic acid, mono alkyl ester itaconate; or neodymium salts of oxo-carboxylic acids such as levulinic acid, acetyl valeric acid, etc; or neodymium salts of hydroxycarboxylic acids such as lactic acid, glycolic acid ethyl ether, glycolic acid butyl ether, etc.

Neodymium salts of phosphoric acids include the neodymium salts of monoalkyl phosphate such as monobutyl phosphate, monoethyl phosphate and the like.

In addition the aforementioned neodymium salts, can also react with a carboxylic acid forming a double salt which can be suitably used. By using a double salt of a carboxylic acid and a neodymium salt, the solubility of the neodymium salt in the polymerizable monomers can be improved.

When making a double salt of a neodymium salt and a carboxylic acid, carboxylic acids that are used include, for example, polymerizable unsaturated carboxylic acids such as methacrylic acid and acrylic acid, as well as non-polymerizable carboxylic acids such as propionic acid, isobutyric acid, n-butyric acid, caproic acid, capric acid, 2-ethylhexanoic acid, stearic acid, octanoic acid and naphthenic acid. These carboxylic acids can either be used separately or can be used as a mixture of two or more carboxylic acids. In the case when the neodymium salt, to be used in forming the double salt, is a salt of a unpolymerizable acid, it is preferred that a polymerizable unsaturated carboxylic acid be used. In regards to the mixing ratio when forming the double salt from a neodymium salt and a carboxylic acid, based on a total of 100% by weight, the percent ratio of the carboxylic acid is preferably within the range of 10–40% by weight. If the percent weight of the carboxylic acid exceeds 40%, not only is the neodymium weight content inside of the beads possessing light selective function decreased, but the mechanical and technical properties of the aforementioned beads are also decreased.

The formation of the double salt from a neodymium salt and a carboxylic acid is carried out by first adding the neodymium salt and the carboxylic acid to the polymerizable monomer, then agitating and mixing. The process is completed either at room temperature or by heating this mixture to a temperature of 100° C. or less, for 0.5-5 hours while agitating.

Additionally, saturated aliphatic alcohols such as propanol and cyclohexanol as well as polyatomic alcohols such as, ethylene glycol, diethylene glycol and propylene glycol can be used at the same time in order to further increase the solubility of the double salt formed from the neodymium salt and the carboxylic acid. In regards to the usage amount of these alcohol types, when taken as a mixture with the carboxylic acid, based on a total of 100% by weight of the mixture plus the neodymium salt, the percent weight of the mixture is preferably between 10–40% by weight: within the mixture, the preferred condition is one in which the carboxylic acid is 10% or greater by weight with the alcohol being 10% or less, and most preferably 5% or less, by weight.

(Meth)acrylic ester and styrene are typical polymerizable monomers for transparent polymers.

Methacrylic esters include alkyl (meth)acrylates such as methyl (meth)acrylate and ethyl (meth)acrylate as well as cyclohexyl (meth)acrylate, tetrahydrofuryl (meth)acrylate, benzyl (meth)acrylate, phenyl (meth)acrylate, allyl (meth)acrylate, methallyl (meth)acrylate, β-naphtyl (meth)acrylate, β-aminoethyl (meth)acrylate, 2-methoxyethyl (meth)acrylate, α-hydroxyethyl (meth)acrylate, ethylene glycol di(meth)acrylate, diethylene glycol di(meth)acrylate, tetraethylene glycol di(meth)acrylate, polyethylene glycol di(meth)acrylate, 1,4-butane diol di(meth)acrylate, 1,6-hexane diol di(meth)acrylate, neopentyl glycol di(meth)acrylate, pentaerythritol tetra(meth)acrylate, and trimethylolpropane tri(meth)acrylate and all of their halogen substituted (meth)acrylates: these are used separately, or in a combination of two or more kinds of these (meth)acrylic esters. Furthermore, among the above mentioned compounds, cross-linked type beads can be formed when using ethylene glycol di(meth)acrylate or any of the multi-functional compounds stated thereafter.

In the polymerizable monomers of these compound, a copolymerizable monomer can be used as long as the transparency of the beads possessing light selective function is not hurt.

These copolymerizable monomers include compounds such as vinyl acetate, acrylonitrile and methacrylonitrile.

The dispersion of the neodymium compound into the polymerizable monomer is carried out by adding the neodymium compound to the aforementioned monomer, mixing, and then dissolving. When this occurs, the formation of the double salt from the neodymium salt and the carboxylic acid can also be carried out at the same time. This is performed by first adding the neodymium salt and the carboxylic acid to the polymerizable monomer, and then agitating and mixing the entire mixture. The mixing is carried out at room temperature or at a temperature of 100° C. or below for 0.5-5 hours while agitating: the double salt is formed and dissolved in the polymerizable monomer by this process.

The mixed solution obtained in this manner is then suspension polymerized, and the desired beads possessing light selective function are thus obtained. In this suspension polymerization, a process is being employed in which the above mentioned polymerizable mixed solution as well as a polymerization initiator are suspended in an ordinary water phase.

Polymerization initiators which are being employed include azobis groups such as α,α'- azobisisobutyronitrile, α,α'-azobis-2,4-dimethyl valeronitrile and α,α'-azobis-2,4-dimethyl-4-methoxy valeronitrile.

These polymerization initiators can be used separately or in a combination thereof. The usage amount, based on a total of 100 parts by weight of the polymerizable components in the above mentioned mixed solution, is 0.001-1 parts by weight.

In addition, in order to stabilize the suspension particles, protective colloids such as polyvinyl alcohol, carboxymethyl cellulose, sodium polyacrylate, gelatin and alginic acid can also be suitably added.

Preferred conditions for polymerization include a process in which the temperature ranges over 30°-90° C. for 1-10 hours; however, the conditions are not limited just to these ranges, as processes in which polymerization is carried out first at low temperature and then continued at increasing temperatures, can also be employed.

Once the polymerization is completed, transparent, globular-shaped beads possessing light selective function can be obtained by the usual method in which the polymerized particle is dewatered, rinsed and then dried.

These beads possessing light selective function are classified according to the desired particle size range by means of a classification machine such as a pneumatic micron selector, then added to and dispersed in the transparent resin composition.

As in the beads possessing light selective function, the neodymium compound is introduced either in a solid or in a dissolved state, the bead bodies become transparent. Additionally, due to the presence of the neodymium compound there is optical absorption in the vicinity of 580 nm: as well, a sharp and high absorptivity is observed as a result of the neodymium compound being in a solid or dissolved state. Furthermore, in the bead bodies, since mechanical characteristics and such are not particularly required, the neodymium content can be sufficiently increased, for example, up to approximately 15% by weight. Additionally, by appropriately varying the polymerization conditions, beads of various particle sizes can be obtained. By changing such factors, as the composition ratio of various types of additives, such as polymerizable monomers, neodymium salts and carboxylic acids, the index of refraction of the beads can be varied according to the uses.

The beads possessing light selective function obtained in this manner, are added and dispersed in various transparent resin compositions to obtain the resin composition of the present invention. In this case, as the transparent resin composition, if transparency is displayed, the following can be used independent of whether thermal plasticity or thermal setting characteristics are shown: polymethyl (meth)acrylate, polystyrene, polyvinyl chloride, acrylonitrile styrene copolymers, polycarbonate, and cellulose plastics.

In the addition of the beads to the these transparent resin compositions, transparent optical products can be obtained when the refractive index of the beads and the refractive index of the transparent resin composition to form a matrix are made identical. Additionally, when the size of the beads is 0.2 $\mu$m or less, even though the indexes of refraction are different, a good transparency can still be obtained. Furthermore, in the case of adding beads with a particle size of approximately 0.5-2 mm, optical products exhibit a granulated surface, while optical products with beads having a particle size of approximately 50-100 $\mu$m display a frosted or opaque (semi-transparent) surface. As well, the optical products with an opaque surface can also be obtained when such photoscattering agents as titanium oxide, talc, and barium sulfate are used together with the beads and transparent resin composition.

The amount of the beads possessing light selective function added to the transparent resin composition, is influenced by both the neodymium content of the beads as well as the uses of the molded articles of the optical products but, generally speaking the range is approximately 2-30 parts by weight, per 100 parts by weight of the transparent resin composition. Due to the structure of the beads containing the neodymium compound, there is no lowering of the mechanical properties in the molded article of the optical products, and thus, as a result, a large quantity of the neodymium can exist in the final optical product. Consequently, both the light selective function of the neodymium can be fully exhibited and almost no decrease in the mechanical properties of the optical products as the final product is exhibited.

Furthermore, coloring agents such as pigments and dyes can be also be used to produce a colored resin composition. When using these coloring agents, by blending the coloring agents having at least one light absorption band in the wavelengths of 380-420 nm, 480-530 nm, 560-610 nm and 640-780 nm, but having a small or no absorption band in the wavelength range of the visible light other than the above mentioned wavelength ranges to the neodymium compound, selective light absorption by the neodymium compound can be made up, or, selective absorption can be carried out in the visible light range where the above mentioned neodymium compound shows no absorption. Coloring agents used in this manner include, the dyes, pigments and ultraviolet absorption agents listed below.

Coloring agents which principally absorb light in the 380-420 nm wavelength region include: salicylic esters such as phenyl salicylate and para-tert-butylphenyl salicylate, benzotriazoles such as 2-(2'-hydroxy-5'-methylphenyl) benzotriazole and 2-(2'-hydroxy-3,5'-di-tert-butylphenyl)5-chloro benzotriazole, and benzophenones such as 2-hydroxy-4methoxybenzophenone, 2-hydroxy-4-methoxy-4'-chloro benzophenone, and 2,2'-dihydroxy-4-octoxybenzophenone.

Coloring agents which principally absorb light in the 480-530 nm wavelength region include red coloring materials such as Hostasol Red GG (produced by Hoechst AG), Pariogen Red 3730 (produced by BASF), Diaresin Red HS (produced by Mitsubishi Kaisei Corporation), Diaresin Red S (produced by Mitsubishi Kaisei Corporation), Amaplast Pink P4B (produced by American Aniline Products Inc.), and Orange C-Type (produced by Hercules Inc.).

Coloring agents which principally absorb light in the 640-780 nm wavelength region include blue coloring materials such as Euvinil blue-702 (produced by BASF A.G.), Oil Blue-615 (produced by Oriental Chemical Company), Macrolex Green 513 (produced by Bayer AG), Zeikagen O Blue (produced by Dainichiseika Color & Chemicals Mfg. Co., Ltd.), and Sumitone Cyanine Blue-HB-1 (Sumitomo Chemical Company Ltd.).

There are no compounds found which, as coloring agents, principally absorb light in the 560-610 nm wavelength region, however, among the coloring agents which principally absorb light in the above mentioned three regions, those coloring agents which also absorb light in the 560-610 nm wavelength region are preferred for use: these agents include, for example, Euvinil blue-702 (produced by BASF A.G.).

The resin composition used together with the above types of coloring agents, is able to absorb red, green and blue light as well as light outside of these three primary colors. In particular, when using such compositions as filters which screen the emission surface of color CRT, the color purity of emission from a fluorescent element as well as the color reproduction properties are improved, and while maintaining a high luster, the contrast is also prevented from decreasing.

By means of various molding methods, optical products possessing light selective function are formed from the resin composition of the present invention. Concrete uses for these optical products include uses as filters, lenses, lighting covers, and image screens such as rear projection screens, signboards and gradings.

As molding methods for these optical products, extrusion molding, injection molding, and calendaring can be mainly listed. In these molding methods, after adding a fixed amount of the above mentioned beads to pellets of the previously polymerized polystyrene, polyvinyl chloride or polymethyl methacrylate and mixing, molded articles such as sheets, films and optical products of various shapes are produced by means of the extrusion molding machine, injection molding machine, or calendar machine. And, when acrylic resins such as polymethyl methacrylate are used as the transparent resin compounds, molded products can even be produced by means of the so called cell cast process. Namely, partially polymerized acrylate is added by the above mentioned beads and poured into the mold and then polymerized.

EXAMPLE

The beads having light selective function were manufactured in accordance with the following.

Manufacturing Example 1

To a flask containing 34% by weight of neodymium methacrylate, 42% by weight of methyl (meth)acrylate, 15% by weight of lauric acid, and 9% by weight of propylene glycol were added, heated at 65° C. under agitation for 2 hours, and thereby dissolved.

In an autoclave with attached agitator and nitrogen gas installation aperture, 100 parts by weight of the above mentioned neodymium monomer mixed solution, 0.5 parts by weight of azobisisobutyronitrile, 3.0 parts by weight of polyvinyl alcohol, and 800 parts by weight of water were mixed at a high rate. After purging with the nitrogen gas, the mixture was heated and the initial polymerization step was carried out at a temperature of 75° C. for 4 hours. The polymerization was then completed by heating at 90° C. for 1 hour in the second polymerization step.

Following this, the polymer was dehydrated, rinsed and dried by conventional procedures and transparent globular beads were obtained. These beads were then classified in a pneumatic micro separator and beads with the desired particle sizes were obtained.

Manufacturing examples 2-7

Neodymium (meth)acrylate without lauric acid, was mixed with octanoic acid at the combination ratio shown in section A of FIG. 1, and then heated and dissolved at a temperature of 65° C. Following this, a fixed amount of monomer from section B of FIG. 1 was added and dissolved at room temperature. After a small undissolved portion was removed, the beads were obtained in the same way as in manufacturing example 1, by suspension polymerization in the autoclave.

Examples 1-6

To 100 parts by weight of the partially polymerized methyl (meth)acrylate (polymerization ratio 20%) and the monomer copolymerizable with it, 0.04 parts by weight of α,α'-azobis(2,4-dimethylvaleronitrile) as the polymerizable catalyst, 0.005 parts by weight of dioctylsulfosuccinate sodium salt as the rubber surface lubricant, and the neodymium containing beads obtained in the above mentioned manufacturing examples 1,4 with the composition shown in FIG. 2, were added, mixed and deaerated. And, the mixture was poured into a mold formed of tempered glass and a soft polyvinyl chloride gasket previously set such that the thickness of the resulting sheet was 3 mm. The casting mold was dipped in 70° C. water for 80 minutes and the polymerization was completed by placing the mold in a 130° C. air bath for 80 minutes. The mold was then removed, and the optical characteristics and spectral transmittance curve of the cast sheet were as shown in table 2 and FIG. 1.

In the cast sheet obtained in this manner, optical diffusivity and a strong absorption in the 580 nm wavelength vicinity can be observed. When this type of cast sheet is used in incandescent electric light bulb covers and in halogen lamp covers, color rendering effects are increased, and so, the cast sheet is useful in lighting equipment.

Examples 7-9, Comparative Example 1

Acrypet VH (methacrylic resin pellet manufactured by Mitsubishi Rayon Co.) and the neodymium containing beads obtained in manufacturing examples 3,6 were compounded to form the composition shown in FIG. 3, which was then agitated thoroughly in a tumbler. After reaching uniformity, using an extruder, the composition was extruded out from the die, passed through three mirrored-surface rollers, and cooled: following which, a resin sheet with a thickness 3 mm was obtained. The optical characteristics of this resin sheet are shown in FIG. 3. From the results of FIG. 3, inorganic dispersing agents or transparent polymer beads with a different index of refraction from that of the base material can be added as necessary, however in both cases, absorption of light in the vicinity of 583 nm wavelength was observed due to the presence of neodymium. When using these extruded sheets to draw up covers for light sources, color lighting equipment having fresh coloring effect was obtainable.

Examples 10-12, Comparative examples 2, 3

In order to provide the structure shown in FIG. 4, cast sheets were manufactured either by the same cast polymerization process as described in example 1 (in examples 10, 11 and comparative examples 2, 3), or by the same extruding process described in example 7 (in example 12). In addition to displaying optical diffusivity, uniformly dispersed neodymium containing beads were present in the sheets of all of the examples; on the other hand, neodymium was not contained in any of the comparative examples.

Further, these resin sheets were interposed between, on one hand, a metal sheet possessing a lenticular mold in which lenticule units of 0.4 mm of pitch and 0.29 mm of R (radius of curvature) and 0.3 mm of pitch and 0.07 mm or R are arraied alternatively and on the other hand, a metal sheet with a mirrored surface. The sheet was heated under a temperature of 180° C. and formed in a heat press machine (molding pressure 25 kg/cm², molding time 15 minutes) : lenticular type projection screens were thus obtained.

Thus obtained projection screens were used in place of the Pioneer Co. manufactured projection television screen, and the color rendering abilities of the colors of the projected television image were compared. In each screen obtained in examples 10-12, there was very little projection of outside light, and the colors red and blue came out very clear; however in each screen obtained in comparative examples 2 and 3, these colors were not so clear and the difference between examples and comparative examples was clearly seen.

The spectral characteristics of the resin sheets in examples 10, 11 and in comparative example 2 are shown in FIG. 2.

Possibilities of Industrial Usage

As explained above, the resin composition of the present invention contains beads containing a large amount of neodymium compound and so possessing light selective functions which show sharp absorption patterns in the vicinity of 580 nm in the transparent resin composition. Additionally, all of the optical products of the present invention, because they can be obtained from the above mentioned resin composition, possess superior light selective characteristics and have a sufficiently high neodymium content with no lowering of mechanical properties.

TABLE 1

| Manufacturing Examples | | 1 | 2 | 3 | 4 | 5 | 6 | 7 |
|---|---|---|---|---|---|---|---|---|
| | | | | | units = % weight | | | |
| A | neodymium methacrylate | 34 | 34 | 34 | 17 | 17 | 17 | 17 |
| | lauric acid | 15 | | 15 | | | | |
| | octanoic acid | | 15 | | 7 | 7 | 7 | 7 |
| B | methyl methacrylate | 42 | 51 | 51 | 40 | 40 | 40 | 40 |
| | tetrahydrofufuryl M* | | | | | 20 | 16 | 36 | 16 |
| | trimethylolpropane triM* | | | | | 16 | 10 | | |
| | neopentyl glycol diM* | | | | | | | | 10 |
| | 1,6 hexane diol diM* | | | | | | 10 | | |
| | styrene | | | | | | | | 10 |
| C | propylene glycol | 9 | | | | | | |
| | neodymium concentration in the beads | 12 | 12 | 12 | 6 | 6 | 6 | 6 |

*M represents methacrylate

TABLE 2

| | Example | 1 | 2 | 3 | 4 | 5 | 6 |
|---|---|---|---|---|---|---|---|
| | | | | Composition units = % weight | | | |
| Monomer composition | Partially polymerized methyl methacrylate *1 | 95 | 96 | 87 | 83 | 93 | 94.5 |
| | Butyl acrylate | | | | 5 | | |
| | 2-ethylhexyl methacrylate | | | | 4 | | |
| Nd containing beads | Manufacturing Example | 1 | 1 | 4 | 4 | 1 | 1 |
| | Average particle size (μm) | 6 | 80 | 7 | 7 | 80 | 6 |
| | Composition | 5 | 4 | 8 | 12 | 5 | 5 |
| Optical diffusing agent composition | Barium sulfate (d = 4 μm) | | | | | 2 | |
| | Cross-linked Polystyrene beads d = 8 μm | | | | | | 0.5 |
| Optical characteristics of cast sheet | Total light ray spectral transmitance (%) | 77.9 | 80.6 | 80.6 | 77.4 | 60.2 | 72.3 |
| | Haze value (%) | 87 | 40 | 62 | 74 | 96 | 92 |
| | 583 nm/560 nm Spectral transmittance ratio | 55/79 | 60/83 | 62/83 | 50/80 | 30/61 | 54/75 |

*1: 20% partial polymerization

TABLE 3

| | Example. Comparative example | Ex. 7 | Ex. 8 | Ex. 9 | Comp. Ex. 1 |
|---|---|---|---|---|---|
| | | | Composition units = % weight | | |
| Composition | Acrypet VH Mitsubishi Rayon Co. acryl resin pellet | 90 | 95 | 93 | 98 |
| | Neodymium containing polymer beads, Manufacturing Ex. 6: Avg. particle dis = 10 μm | 10 | | | |
| | Neodymium containing polymer beads, Manufacturing Ex. 3: Avg. particle dia = 6 μm | | 5 | 5 | |
| | Barium sulfate Avg. particle dia = 4 μm | | | 2 | 2 |
| Sheet Optical characteristics | Total light ray spectral transmittance % | 81 | 78 | 70 | 75 |
| | Haze value % | 64 | 87 | 98 | 98 |
| | 583 nm/560 nm spectral transmittance ratio | 61/87 | 55/85 | 58/74 | 75/75 |

TABLE 4

| | Example, Comparative Example (C. Ex.) | Ex. 10 | Ex. 11 | Ex. 12 | C. Ex. 2 | C. Ex. 3 |
|---|---|---|---|---|---|---|
| | | | | Composition units = parts by weight | | |
| Polymer | Polymethyl methacrylate | 92 | 98 | 88 | 100 | 100 |
| Coloring Agent Composition | O Plus Green 533 *2 | | $5.8 \times 10^{-5}$ | $5.8 \times 10^{-5}$ | $5.8 \times 10^{-5}$ | $5.8 \times 10^{-5}$ |
| | Sirius Black G *3 | | $4.2 \times 10^{-3}$ | $4.2 \times 10^{-3}$ | $4.2 \times 10^{-3}$ | $4.2 \times 10^{-3}$ |
| | Sumiplast Red 3B *4 | | $4.0 \times 10^{-5}$ | $4.0 \times 10^{-5}$ | $4.0 \times 10^{-5}$ | $4.0 \times 10^{-5}$ |
| Nd containing beads | Manufacturing Example | 3 | 3 | 7 | | |
| | Avg. particle diameter (μm) | 6 | 6 | 80 | | |
| | Composition | 8 | 5 | 12 | | |

TABLE 4-continued

| Example, Comparative Example (C. Ex.) | | Ex. 10 | Ex. 11 | Ex. 12 | C. Ex. 2 | C. Ex. 3 |
|---|---|---|---|---|---|---|
| | | | | Composition units = parts by weight | | |
| Optical diffusing agent Comp. | Cross-linked Polystyrene beads dia = 8 μm | 0.04 | 0.04 | | 0.08 | 0.04 |
| Optical characteristics of cast sheet | Total light ray spectral transmittance (%) | 82 | 44 | 45 | 44 | 51 |
| | 583 nm/560 nm Spectral transmittance ratio (%) | 62/88 | 31/46 | 30/48 | 42/42 | 48/48 |

*2: Product of Orient Chemical Company
*3: Product of Bayer AG
*4: Product of Sumitomo Chemical Company Ltd.

We claim:

1. A resin composition comprising a blend of a transparent resin and beads, said beads possessing light selective function, having a particle diameter of from 0.01 μm to 5 mm, and being composed of a transparent polymer containing a neodymium compound, wherein said beads are dispersed in said transparent resin.

2. A resin composition according to claim 1 wherein said neodymium compound is at least one member selected from the group consisting of polymerizable unsaturated neodymium carboxylates, unpolymerizable neodymium carboxylates, neodymium salt monoalkylphosphates, neodymium salts of aliphatic sulfonic acids, and neodymium salts of aromatic sulfonic acids.

3. A resin composition according to claim 2 wherein said neodymium compound is a neodymium carboxylate.

4. A resin composition according to claim 3 wherein said neodymium compound is a double salt consisting of a neodymium salt and a carboxylic acid.

5. A resin composition according to claim 1 wherein said beads possessing light selective function are dispersed in the amount of 2-30 parts by weight per 100 parts by weight of said transparent resin.

6. A resin composition according to claim 1 wherein said transparent polymer is a polymer of a methacrylic ester or a styrene.

7. A resin composition according to claim 6 wherein said transparent polymer is a copolymer of at least one member selected from the group consisting of 8. An optical product comprising a resin composition according to claim 1, vinyl acetate, acrylonitrile and methacrylonitrile, and a methacrylic ester or a styrene.

* * * * *